United States Patent [19]
Nakahara et al.

[11] Patent Number: 5,422,569
[45] Date of Patent: Jun. 6, 1995

[54] ROTATION DETECTING APPARATUS USING MAGNETRORSISTIVE ELEMENT WITH AN ARRANGEMENT OF DETECTION UNITS

[75] Inventors: Toru Nakahara, Tokyo; Naoyuki Ohta, Chiba; Hitoshi Ejiri, Tokyo, all of Japan

[73] Assignee: Sony Corporation, Japan

[21] Appl. No.: 61,556

[22] Filed: May 17, 1993

[30] Foreign Application Priority Data

May 29, 1992 [JP] Japan .................. 4-163691

[51] Int. Cl.[6] .............. G01P 3/48; G01P 3/487; H02K 29/08
[52] U.S. Cl. .................. 324/174; 310/68 B; 324/207.21
[58] Field of Search ............ 324/207.2, 207.21, 207.25, 324/173, 174, 252; 310/68 B

[56] References Cited

U.S. PATENT DOCUMENTS

| | | | |
|---|---|---|---|
| 4,039,936 | 8/1977 | Jones et al. | 324/207.21 |
| 4,599,561 | 7/1986 | Takahashi et al. | 324/207.21 X |
| 4,725,776 | 2/1988 | Onodera et al. | 324/207.21 |
| 4,801,830 | 1/1989 | Ogino et al. | 324/252 X |
| 5,198,762 | 3/1993 | Shimoe et al. | 324/207.21 |

Primary Examiner—Gerard R. Strecker
Attorney, Agent, or Firm—Ronald P. Kananen

[57] ABSTRACT

A rotation detecting apparatus including a magnet having alternatively-arranged N-poles and S-poles on a rotator, and a magnetoresistive element having plural (six) magnetoresistive units which are continuously arranged at a predetermined interval on a stator, and signal output units which are provided at prescribed three positions of connection points of the plural detection units, wherein the detection units serving to detect magnetic field which is varied in accordance with rotation of the rotor, and the signal output units serving to output signals whose phases are different from one another by 120° on the basis of the detection of the magnetic field by the detection units.

3 Claims, 5 Drawing Sheets

FIG. 7
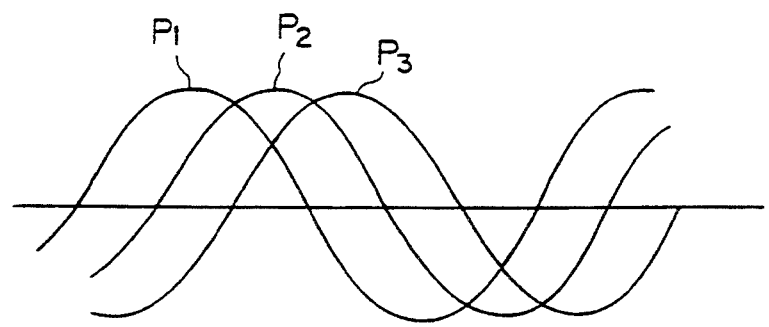
FIG. 1    (PRIOR ART)
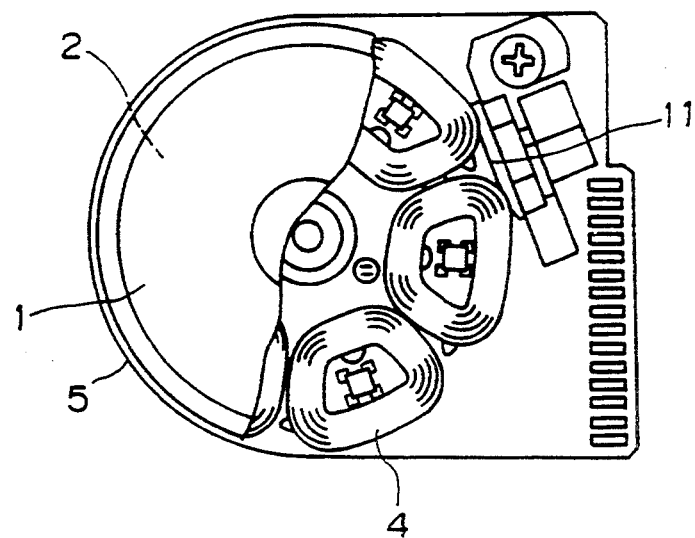

ROTATION DETECTING APPARATUS USING MAGNETRORSISTIVE ELEMENT WITH AN ARRANGEMENT OF DETECTION UNITS

BACKGROUND OF THE INVENTION

1. Field of the Invention

This invention relates to a rotating detecting apparatus suitable to detect a rotational status of a rotator such as a capstan motor for use in a video tape recorder, etc.

2. Description of Related Art

FIG. 1 is a plan view of a conventional capstan motor for a VTR (video tape recorder), which partially contains a broken-out section, and FIG. 2 is a cross-sectional view of the capstan motor as shown in FIG. 1. In the capstan motor as shown in FIGS. 1 and 2, a main magnet 2 is disposed inside of a rotor 1, and a coil 4 is disposed at a stator 3 side so as to be faced to the main magnet 2. With this construction, the main magnet 2 and the rotor 1 are rotated in accordance with polarization shift of the coil 4.

In this capstan motor thus constructed, an FG (frequency generator) magnet 5 on which N-poles and S-poles are alternately magnetized at a predetermined interval of $\lambda/2$ is further provided on the peripheral surface of the rotor 1, and a sensor 11 having a magnetoresistive (MR) element 11a for sensing a magnetic field generated by the N-poles and the S-poles of the FG magnet 5 is also disposed at the stator 3 side.

As shown in FIG. 3(B), the magnetoresistive (MR) element 11a on the sensor 11 includes four magnetoresistive units A', B', C' and D' each comprising a rectangular thin-film magnetoresistive element, which are disposed on a plane at an approximately quarter interval of a magnetization interval $\lambda$ of the same poles (for example, N-poles) of the FC magnet 5. The equivalent circuit to the magnetoresistive element 11a is a bridge circuit as shown in FIG. 3(C). That is, the magnetoresistive element 11a is constructed by the loop-connection of the magnetoresistive units A', B', C' and D' in a clockwise direction (in clockwise order). The connection point of the magnetoresistive units B' and C' is connected to a terminal for outputting an FG signal P' as described later, and the connection point between the magnetoresistive units A' and D' is connected to a terminal For outputting an FG signal P as described later. Further, the connection point between the magnetoresistive units A' and B' is connected to a power source Vcc, and the connection point between the magnetoresistive units C' and D' is connected to a ground GND (grounded).

In the magnetoresistive element 11a on the sensor 11 thus constructed, the magnetoresistive units such as the magnetoresistive units A' and C' as shown in FIG. 3(A) to which magnetic field in an Y-direction is applied From the FG magnet 5 are decreased in resistance value, and the magnetoresistive units such as the magnetoresistive units B' and D' to which magnetic field in an X-direction is applied From the FG magnet 5 are invariable in resistance value.

Therefore, as the FG magnet 5 is rotated together with the rotor 1, the potential at the connection point between the magnetoresistive units B' and C' (FG signal P') or the potential at the connection point between the magnetoresistive units A' and D' (FG signal P) in the equivalent circuit as shown in FIG. 3(C) are increased or decreased. Therefore, the sensor 11 can detect the rotational status of the rotor 1 (FG magnet 5) on the basis of the FG signal P' or FG signal P.

The potential at the connection point between the magnetoresistive units B' and C' (FG signal P') and the potential at the connection point between the magnetoresistive units A' and D' (FG signal P) in the equivalent circuit as shown in FIG. 3(C) are varied (increased or decreased) oppositely to each other (that is, when one is increased, the other is decreased), and thus these signals P and P' are signals whose phases are different From each other by 180° C. (that is signals having opposite-phase signals). Accordingly, the conventional device has generally adopted a method that S/N of the FG signal is beforehand improved by, obtaining a difference between the FG signal P' and the FG signal P, and then the rotational status of the rotor 1 (FG magnet 5) is detected.

Therefore, in this device, the difference between the FG signal P' and the FG signal P is beforehand obtained, then a zero-cross point of the difference signal thus obtained is counted, and then a rotating speed of the rotor 1 (main magnet 2) is detected. In order to design the device in a compact size, the outer diameter of the FG magnet 5 is required to be small. However, the magnetization pitch $\lambda$ between the same poles can not be set to be small. Therefore, when the outer diameter of the FG magnet 5 is set to a small value without varying the magnetization pitch of the Fg magnet 5, the rate of the magnetization pitch $\lambda$ the outer diameter of the FG magnet is increased, and thus a period of the FG signal P' and the FG signal P is increased (frequency is lowered). Since the phase difference between the FG signal P' and the FG signal P is 180°, the number of zero-cross points of the difference signal between the FG signals P' and P is reduced.

In a case where the number of zero-cross points of the difference signal between the FG signals P' and P per one-rotation of the FG magnet 5 is reduced as described above, the zero-cross point number is further reduced when the rotor 1 is rotated at a lower speed for example. Therefore, there occurs a problem that the detection accuracy For the rotating speed of the rotor 1 (main magnet 2) is deteriorated. In addition, in a case where the rotating speed off the rotor 1 (main magnet 2) is controlled with the zero-cross point number as described above, there occurs another problem that the control of the rotating speed is difficult at a low-speed area.

SUMMARY OF THE INVENTION

An object of this invention is to provide a rotation detecting apparatus capable of improving a detection accuracy of a rotation status of a rotator and easily controlling the rotation status of the rotator with high detection accuracy.

In order to attain the above object, according to one aspect of this invention, the rotation detecting apparatus includes a magnet having N-poles and S-poles which are alternately arranged on a rotator, and a magnetoresistive element having plural detection units which are continuously arranged at a predetermined interval on a stator disposed so as to be faced to the rotator, and signal output units which are provided at prescribed three positions of connection points of the plural detection units, the detection units serving to detect magnetic field which is varied in accordance with rotation of the rotor, and the signal output units serving to output signals whose phases are different from one another by 120° on the basis of the detection of the magnetic field by the detection units.

The magnetoresistive element comprises six first to sixth detection units. The second detection unit is located away from the First detection unit at an interval of approximately 1/6 of a magnetization interval of the same poles of the magnet, the third to fifth detection units are located away from the second detection unit in this order at an interval of approximately 1/12, 2/12 and 3/12 respectively, of the magnetization interval, and the sixth detection unit is located away from the fifth detection unit at an interval of approximately 1/6 of the magnetization interval.

Further, the signal output detection units are disposed at three connection points between the first and third detection units, between the second and fifth detection units and between the fourth and sixth detection units.

According to another aspect of this invention, the rotation detecting apparatus for use in a capstan motor includes an FG (frequency generator) magnet provided on an outer periphery of a rotor supporting a motor driving magnet, and a magnetoresistive element serving as a stator supporting a coil and including plural detection units which are continuously disposed at a predetermined interval so as to be faced to the FG magnet, and signal output portions which are disposed at predetermined three positions of connection points between the plural detection units, the detection units serving to detect magnetic field which is varied in accordance with rotation of the rotor, and the signal output units serving to output signals whose phases are different from one another by 120° on the basis of the detection of the magnetic field by the detection units.

BRIEF DESCRIPTION OF THE DRAWINGS

FIG. 1 is a plan view of a conventional capstan motor;

FIG. 7 is a waveform diagram showing FG signals P1, P2 and P3 output from the magnetoresistive element 6a as shown in FIG. 5.

DETAILED DESCRIPTION OF THE PREFERRED EMBODIMENTS

Figure 2:
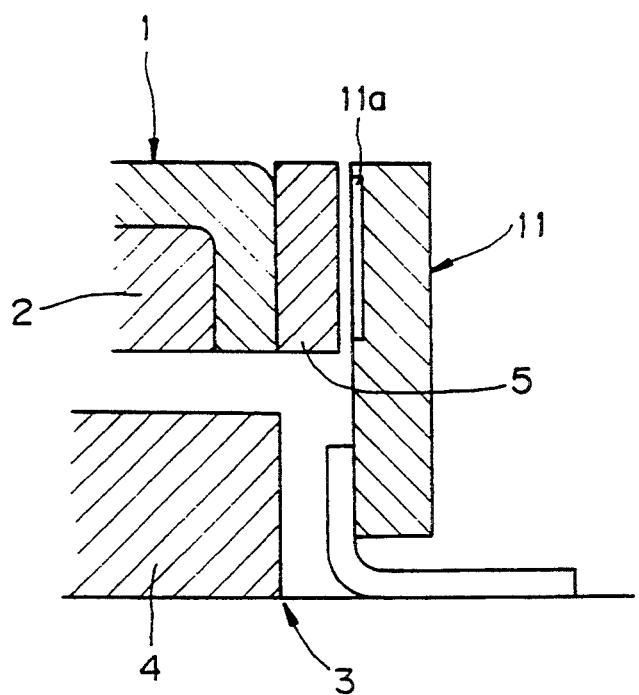
FIG. 2 is a cross-sectional view of the capstan motor as shown in FIG. 1.
Figure 3:
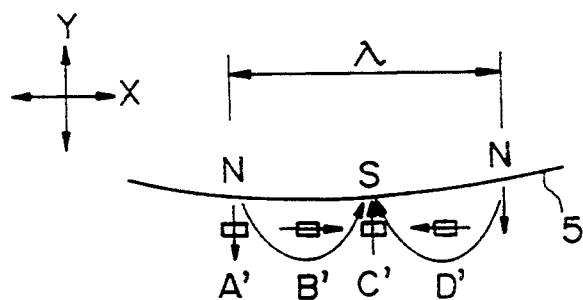
FIGS. 3a, 3b, and 3c, together show the detailed construction of a magnetoresistive clement 11a as shown in FIG. 2.
Figure 3:
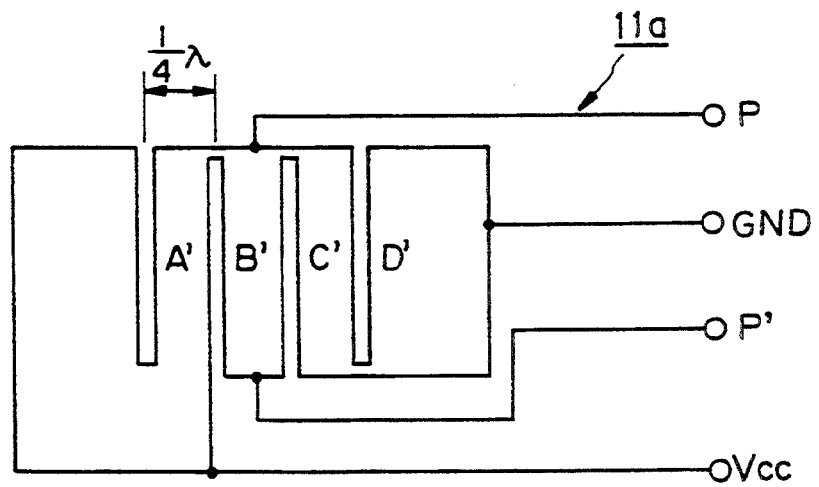
Figure 3:
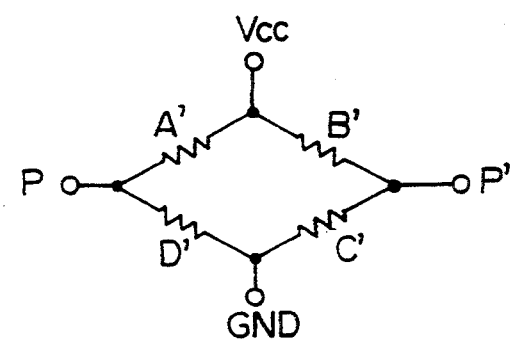
Figure 4:
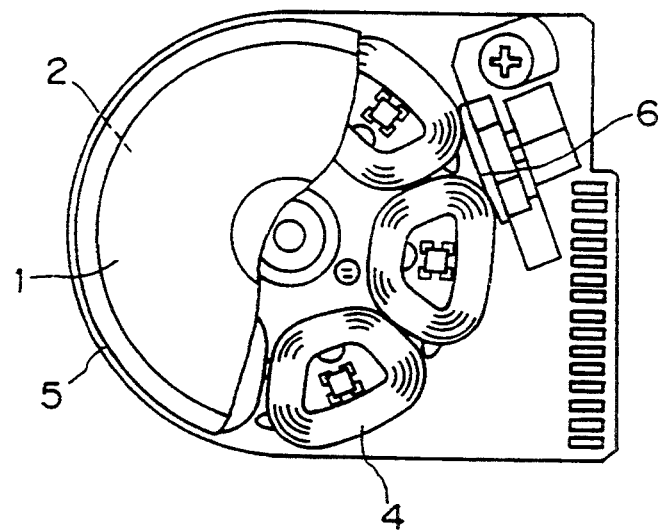
FIG. 4 is a plan view of an embodiment of a capstan motor to which a rotation detecting apparatus of this invention is applied.
Figure 5:
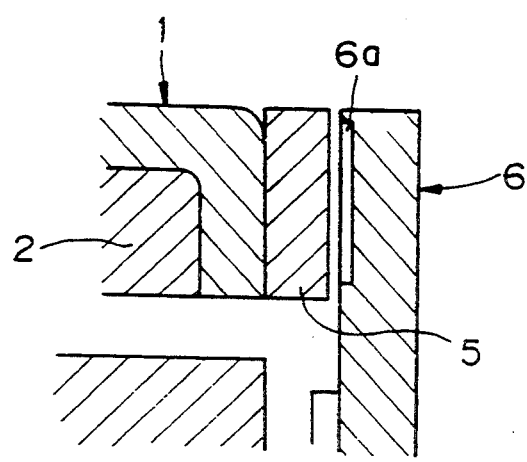
FIG. 5 is a cross-sectional view of the capstan motor as shown in FIG. 4.

FIG. 4 shows the construction of an embodiment of a capstan motor for a VTR (video tape recorder) to which the rotation detecting apparatus of this invention is applied, and partially contains a plane view of the capstan motor, FIG. 5 is a cross-sectional view of the capstan motor as shown in FIG. 4. In FIG. 4 or 5, the same units as FIG. 1 or 2 are represented by the same reference numerals.

Figure 6:
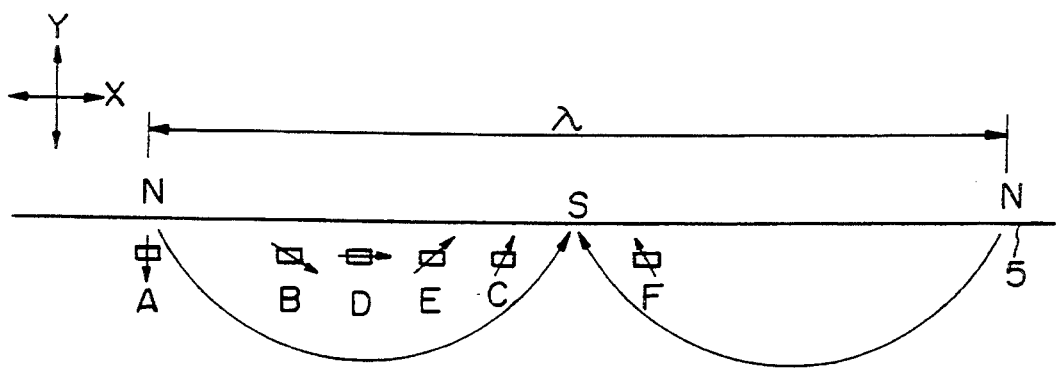
FIG. 6a, 6b, and 6c, together show the detailed construction of a magnetoresistive element 6a as shown in FIG. 5.
Figure 6:
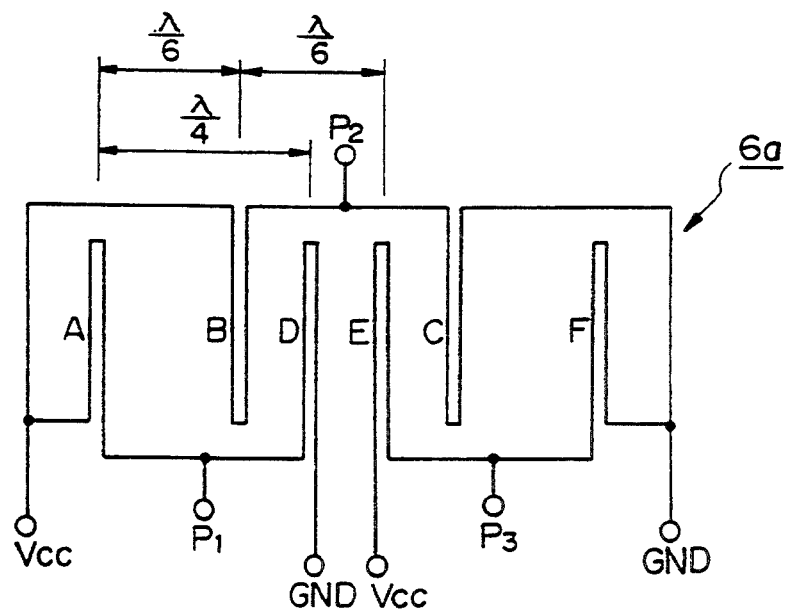
Figure 6:
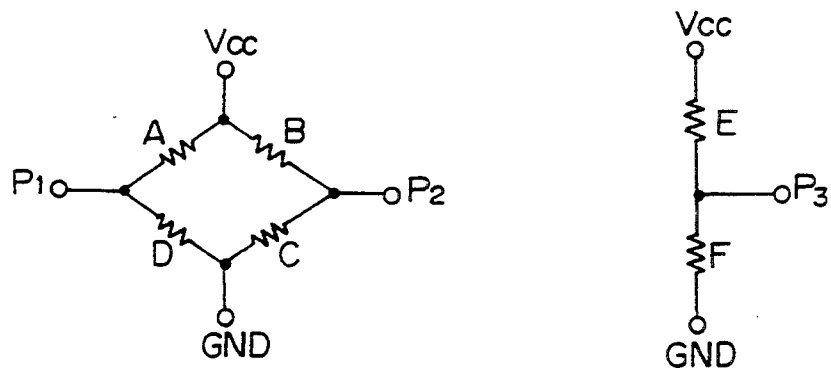

A magnetoresistive element 6a which is disposed on a sensor 6 so as to be faced to an FG magnet 5 comprises six magnetoresistive units A, B, C, D, E and F. As shown in FIG. 6(A), the magnetoresistive element B is disposed away from the magnetoresistive element A at an interval which is approximately 1/6 of a magnetization pitch λ of the same poles (for example, N-poles) of the FG magnet 5, and the magnetoresistive units D, E and C are disposed away from the magnetoresistive element B in this order at an interval of approximately λ/12, 2λ/12, and 3λ/12 respectively. The magnetoresistive element F is disposed away from the magnetoresistive element C at an interval of approximately λ/6.

As shown in FIG. 6(B) (or in an equivalent circuit of FIG. 6(C)), in the magnetoresistive element 6a comprising the six magnetoresistive units A, B, C, D, E and F, one end of the magnetoresistive element A is connected to a power source Vcc while the other end of the magnetoresistive element A is connected to one end off the magnetoresistive element D, and the other end of the magnetoresistive element D is connected to a ground GND. Further, one end of the magnetoresistive element E is connected to the power source Vcc while the other end of the magnetoresistive element E is connected to one end of the magnetoresistive element F, and the other end of the magnetoresistive element F is connected to the ground GND. The connection point between the other end of the magnetoresistive element F and the ground GND is connected to one end of the magnetoresistive element C, and the other end of the magnetoresistive element C is connected to one end of the magnetoresistive element B. The other end of the magnetoresistive element B is connected to the connection point between the magnetoresistive element A and the power source Vcc.

The connection point between the magnetoresistive units A and D is connected to a terminal for outputting an FG signal P1, and the connection point between the magnetoresistive units B and C is connected to a terminal for outputting an FG signal P2 having a phase which is deviated from that of the FG signal P1 by 120°. The connection point between the magnetoresistive units E and F is connected to a terminal for outputting an FG signal P3 having a phase which is deviated From that of the FG signal P1 by 240° (deviated from that of the FG signal P2 by 120°).

In the magnetoresistive element 6a on the sensor 6 thus constructed, the magnetoresistive element, such as the magnetoresistive element A as shown in FIG. 6(A) to which only a magnetic field in a Y-direction is applied is decreased in resistance value, and the magnetoresistive element, such as the magnetoresistive element D as shown in FIG. 6(A) to which only a magnetic field in an X-direction is applied is unvaried in resistance value. Further, the magnetoresistive units such as the magnetoresistive units B, C, E and F to which a magnetic field in a direction other than any one of the X- or Y- directions is applied are more decreased in resistance value as the component of the magnetic field in the Y-direction is increased.

Accordingly, the magnetoresistive element such as the magnetoresistive element A as shown in FIG. 6(A) to which only the magnetic field in the Y-direction is applied has a "small" resistance value, the magnetoresistive element such as the magnetoresistive element D to which only the magnetic field in the X-direction is applied has a "large" resistance value, the magnetoresistive units such as the magnetoresistive units B and E to which a magnetic field having relatively larger component in the X-direction is applied have a "middle-large" resistance value, and the magnetoresistive units such as the magnetoresistive units C and F to which a magnetic field having relatively larger component in the Y-direction is applied have a "middle-small" resistance value. Therefore, when the FG magnet 5 provided on the rotor 1 is rotated through the rotation of the rotor 1, the resistance value of the magnetoresistive element A is varied as follows:

... →small→middle-small→middle-large→large→middle-large→middle-small→small→ ... , the resistance value of the magnetoresistive element B is varied as follows:

... →middle-large→large→middle-large→middle-small→small→middle-small→middle-large→ ... , the resistance value of the magnetoresistive element C is varied as follows:

... →middle-small→small→middle-small→middle-large→large→middle-large→middle-small→ ... , the resistance value of the magnetoresistive element D is varied as follows:

... →large→middle-large→middle-small→small→middle-small→middle-large→large→ ... , the resistance value of the magnetoresistive element E is varied as follows:

... →middle-large→middle-small→small→middle-small→ middle-large→large→middle-large→ ... , and the resistance value of the magnetoresistive element F is varied as follows:

... →middle-small→middle-large→large→middle-large→middle-small→small→middle-small→ ...

Therefore, assuming the large-and-small relationship between the voltage levels in the equivalent circuit of the magnetoresistive element 6a as shown in FIG. 6(C) as follows:

L level<ML level<MH level<H level (hereinafter referred to as "L", "ML", "MH" and "H", respectively), the FG signal P1 which is the voltage at the connection point between the magnetoresistive units A and D is varied as follows:

... →H→MH→ML→L→ML→MH→H→ ... , the FG signal P2 which is the voltage at the connection point between the magnetoresistive units B and C is varied as follows:

... →ML→L→ML→MH→H→MH→ML→ ... , and the FG signal P3 which is the voltage at the connection point between the magnetoresistive units E and F is varied as follows:

... →ML→MH→H→MH→ML→L→ML→ ...

That is, assuming the phase of the FG signal P1 to be a reference phase, as shown in FIG. 7, the phases of the FG signals P2 and P3 are delayed from the phase of the FG signal P1 by 120° and 240° respectively, Therefore, the FG signals P1, P2 and P3 whose phases are deviated from one another by 120° are output from the sensor 6.

With the FG signals P1, P2 and P3 whose phases are deviated from one another by 120°, the FG signal P1 has two zero-cross points at one period, and each of the FG signals P2 and P3 has two zero-cross points while the phase of the zero-cross points thereof is deviated from that of the FG signal P1 by 120° or 240°, so that the interval between the respective zero-cross points of the FG signals P1, P2 and P3 is fixed to a constant value.

Accordingly, the frequency of the FG signal is substantially heightened (the number of zero-cross points per one rotation of the rotor 1 is increased), so that the detection accuracy of the rotational status of the rotor 1 is improved.

What is claimed is:

1. An incremental rotation detecting apparatus for detecting rotation of a rotator relative to a stator along a rotation path about a rotation axis comprising:

a magnet element having N-poles and S-poles which are alternately arranged on said rotator along said rotation path about said rotation axis, each N-pole and S-pole being separated by half of a magnetization interval; and a magnetoresistive element having first to sixth detection units disposed on said stator facing said rotator, each of said detection units being disposed along said rotation path to detect the presence of magnetic fields from said N-poles and S-poles of said magnet element;

wherein said first to sixth detection units each have two terminals and are arranged to form first, second, and third half-bridge circuits for providing first, second and third periodic output signals, respectively, when said rotator rotates relative to said stator about said rotation axis, such that said second periodic output signal is delayed approximately 120 degrees relative to said first periodic output signal and said third periodic output signals is delayed approximately 120 degrees relative to said second periodic output signal;

said first half-bridge being comprised of said first and third detection units, said second half-bridge being comprised of said second and fifth detection units, and said third half-bridge being comprised of said fourth and sixth detection units;

said second detection unit being located away from said first detection unit at an interval of approximately 1/6 of said magnetization interval, said fourth detection unit being located away from said second detection unit at an interval of approximately 1/6 of said magnetization interval, said third detection unit being located away from said first detection unit at an interval of approximately ¼ of said magnetization interval, said fifth detection unit being located away from said second detection unit at an interval of approximately ¼ of said magnetization interval, and said sixth detection unit being located away from said fourth detection unit at an interval of approximately ¼ of said magnetization interval.

2. The rotation detecting apparatus as claimed in claim 1, wherein said first output signal of said first half-bridge is taken from a connection point between one terminal of each of said first and third detection units, the other terminals of said first and third detection unit being connected to a first potential and ground respectively;

said second output signal of said second half-bridge is taken from a connection point between one terminal of each of said second and fifth detection units, the other terminals of said second and fifth detection unit being connected to a first potential and ground respectively;

said third output signal of said third half-bridge is taken from a connection point and between said fourth and sixth detection units, the other terminals of said fourth and sixth detection unit being connected to a first potential and ground respectively.

3. A rotation detecting apparatus for detecting rotation of a rotor relative to a stator along a rotation path about a rotation axis for use in a capstan motor, including:

- an FG (frequency generator) magnet provided on an outer periphery of said rotor supporting a motor driving magnet; said FG magnet having N-poles and S-poles which are alternately arranged on a rotor along said rotation path about said rotation axis, each N-pole and S-pole being separated by half of a magnetization interval; and
- a magnetoresistive element having first to sixth detection units disposed on said stator facing said rotator, each of said detection units being disposed along said rotation path to detect the presence of magnetic fields from said N-poles and S-poles of said FG magnet;
- wherein said first to sixth detection units each have two terminals and are arranged to form first, second, and third half-bridge circuits for providing first, second and third periodic output signals, respectively, when said rotator rotates relative to said stator about said rotation axis,
- such that said second periodic output signal is delayed approximately 120 degrees relative to said first periodic output signal and said third periodic output signals is delayed approximately 120 degrees relative to said second periodic output signal;
- said first half-bridge being comprised of said first and third detection units,
- said second half-bridge being comprised of said second and fifth detection units, and
- said third half-bridge being comprised of said fourth and sixth detection units;
- said second detection unit being located away from said first detection unit at an interval of approximately 1/6 of said magnetization interval,
- said fourth detection unit being located away from said second detection unit at an interval of approximately 1/6 of said magnetization interval,
- said third detection unit being located away from said first detection unit at an interval of approximately $\frac{1}{4}$ of said magnetization interval,
- said fifth detection unit being located away from said second detection unit at an interval of approximately $\frac{1}{4}$ of said magnetization interval, and
- said sixth detection unit being located away from said fourth detection unit at an interval of approximately $\frac{1}{4}$ of said magnetization interval; and wherein
- said magnetoresistive element is disposed on said stator supporting a coil.

* * * * *